United States Patent

[11] 3,586,307

| [72] | Inventor | Nelson R. Brownyer |
| | | Bloomfield Township, Mich. |
| [21] | Appl. No | 836,430 |
| [22] | Filed | June 25, 1969 |
| [45] | Patented | June 22, 1971 |
| [73] | Assignee | North American Rockwell Corporation |
| | | Pittsburgh, Pa. |

[54] COMPOSITE SPRING ASSEMBLY
12 Claims, 12 Drawing Figs.

[52] U.S. Cl.................................................... 267/47,
267/49
[51] Int. Cl..................................................... F16f 1/22
[50] Field of Search.............................. 267/47, 49, 50

[56] References Cited
UNITED STATES PATENTS
3,376,033  4/1968  Sherwood..................... 267/47
3,456,939  7/1969  Duchemin..................... 267/47

Primary Examiner—James B. Marbert
Attorneys—John R. Bronaugh, Floyd S. Levison, E. Dennis O'Connor and Richard A. Speer ABSTRACT: A composite leaf spring assembly adapted to be interposed between a vehicle body and a supporting axle unit comprises two substantially coextensive individual leaf members, one being a constant width, constant thickness steel element and the other being made mainly of hard tough plastic. The opposite ends of the plastic leaf member carry metal caps also formed to extend around eyes on the ends of the steel member for attachment to the vehicle body. A central rigid boxlike structure fixedly secures intermediate portions of both of said leaf members together and to said axle unit, and this structure encloses and protects the plastic leaf member against crushing. The leaf members have only metal to metal contact in the assembly, the regions between the end caps and rigid central structure being free of contact with each other.

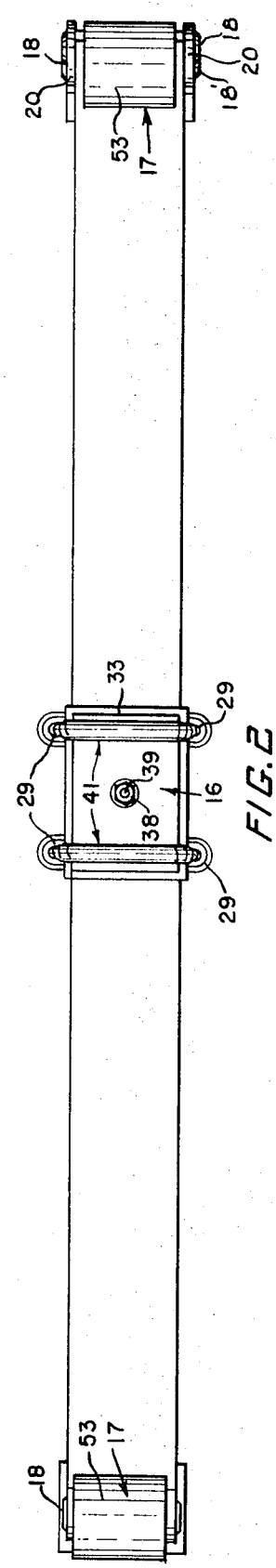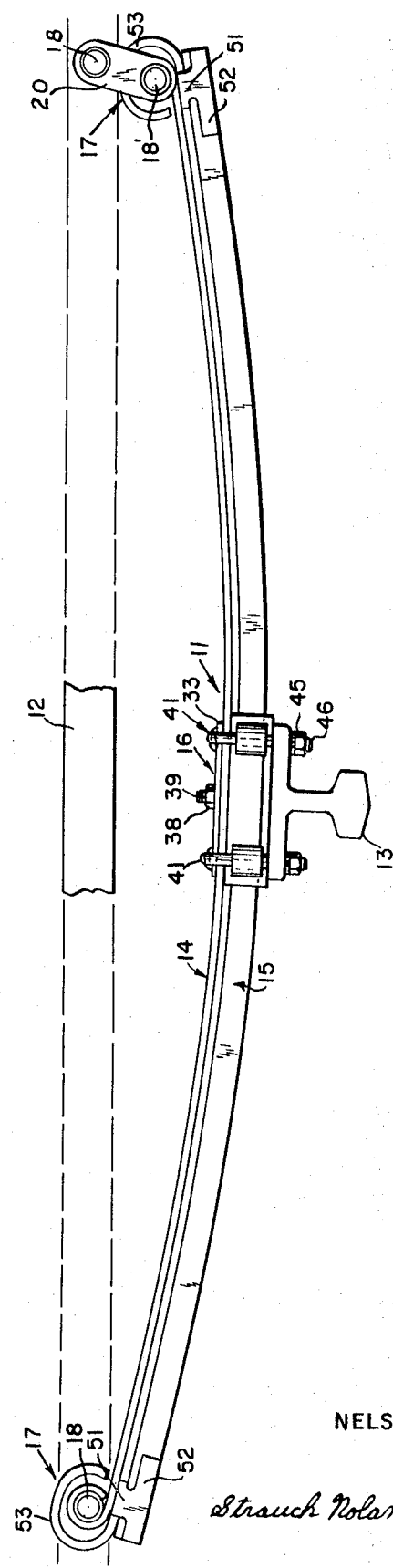

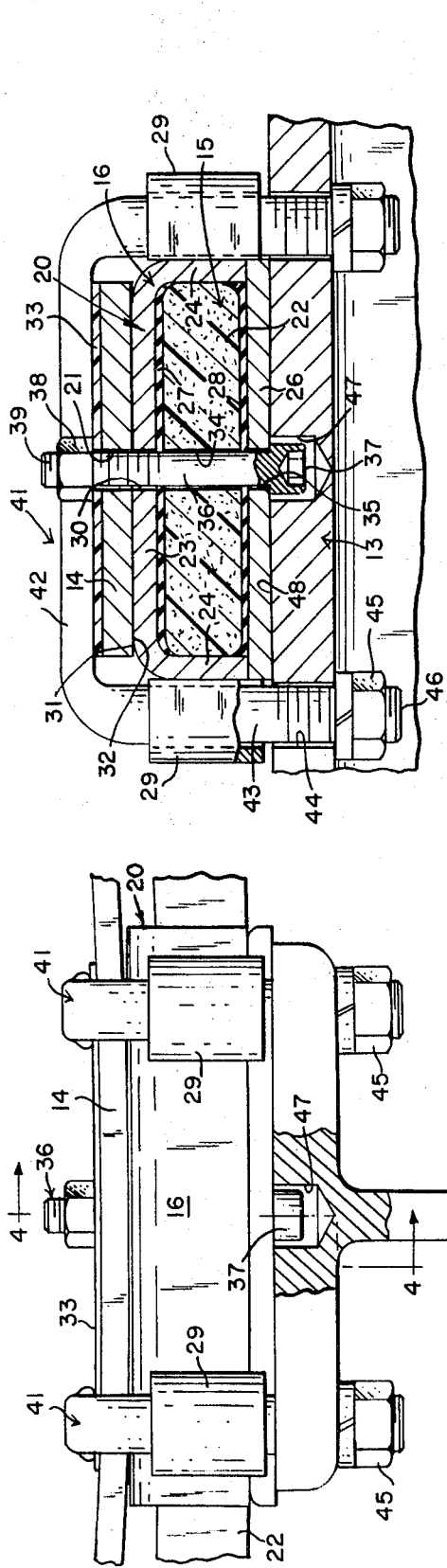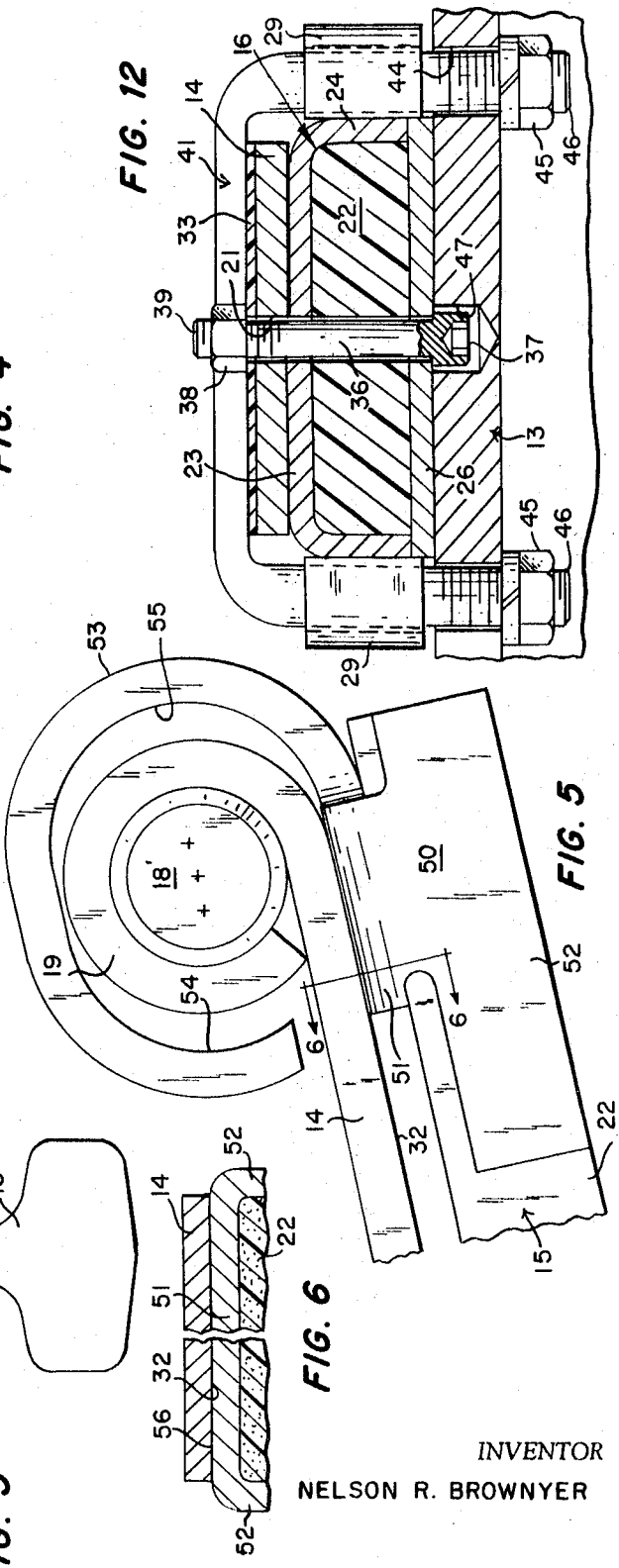

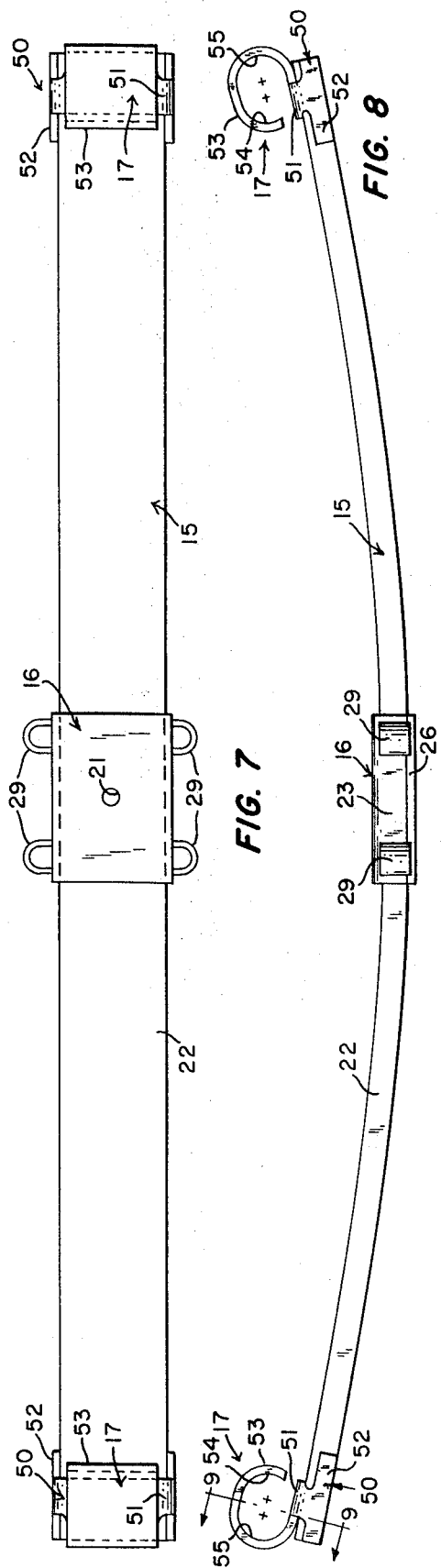
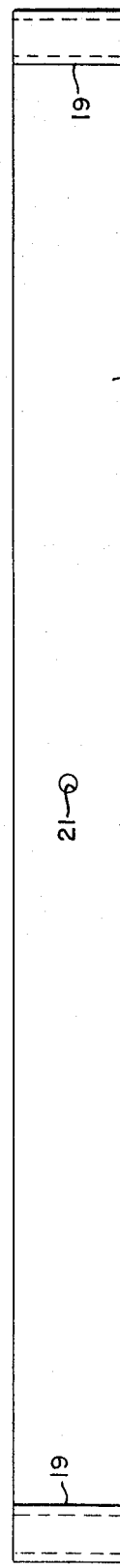
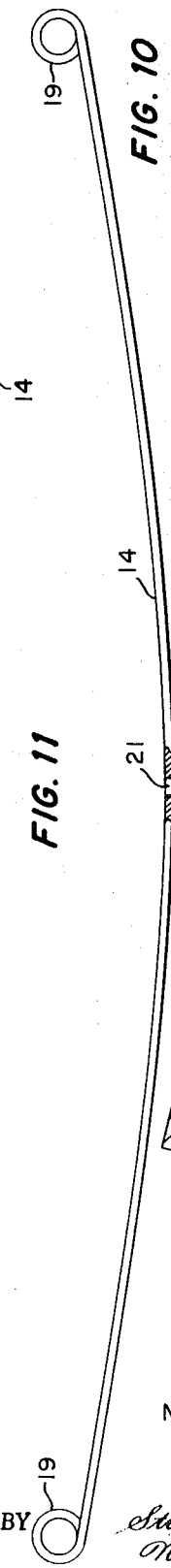
INVENTOR
NELSON R. BROWNYER

COMPOSITE SPRING ASSEMBLY

BACKGROUND AND SUMMARY OF INVENTION

This invention relates to composite leaf spring assemblies for roadway vehicles wherein metal and nonmetallic plastic spring leaf members are combined in a special structure.

Since spring leaf members made of plastic would be mainly lighter in weight, less expensive and essentially corrosion resistant as compared to the usual steel leaf members currently used in vehicle suspensions and since a spring leaf of plastic may readily be molded to a given shape having desired characteristics, a considerable amount of investigation has been devoted to the problem of adapting plastic leaf members to vehicle suspensions.

Multileaf springs consisting of reinforced plastic leaf members such as disclosed in Rosen U.S. Pat. No. 3,142,598 have been proposed but such have not been adopted because they have insufficient strength to withstand normal vehicle wear and shocks and do not possess desirable flexure characteristics without having excessive bulk. The leaf members are also subject to localized cuts or deformation which result in regions susceptible of failure during operation.

It has also been proposed to use composite spring assemblies wherein superposed metal leaf members are bonded together by layers of resilient material such as rubber or spacers of plastic disposed between coextensive surfaces as disclosed in the U.S. Pats. to Hallam No. 3,053,527; Brownyer No. 3,204,944; Crites et al. No. 2,597,299; Symans No. 2,987,308; Banning No. 2,559,105 and Benz No. 2,882,043. Sherwood U.S. Pat. No. 3,376,033 discloses a composite spring wherein the central portion is plastic and the leaf has rigid metal end extensions connecting it to the frame.

The foregoing patents are representative of the many efforts to adapt molded plastic leaf elements into vehicle suspensions and while each have certain specific advantages none of them represent a complete solution of the general problem. The invention represents considerable improvement over these efforts by providing a novel composite metal and plastic leaf spring assembly which has the strength and durability of a metal leaf assembly but at the same time incorporates the advantages of the elastic modulus exhibited by a plastic leaf member; and this is the major object of the invention.

The present invention provides a composite leaf spring suspension structure wherein a metal, preferably spring steel, spring leaf member and a mainly plastic leaf member are connected together only at their ends where they are adapted to be attached to the vehicle body or frame and at intermediate portions where they are adapted to be attached to the axle structure, the end and intermediate portions of said leaf members being in metal to metal contact only and the coextensive regions of said leaf members intermediate the end and intermediate portions being free of contact. The plastic leaf member is protected against crushing where it is attached to the metal leaf member and the axle. These are other important objects of the invention.

BRIEF DESCRIPTION OF DRAWINGS

FIG. 1 is a side elevation showing, attached to an axle member, a composite reinforced embodiment of the invention;

FIG. 2 is a top plan view of the assembly of FIG. 1;

FIG. 3 is an enlarged fragmentary side elevation partly broken away and in section showing attachment of the spring assembly to an axle member;

FIG. 4 is an enlarged view mainly in section substantially on line 4-4 of FIG. 3;

FIG. 5 is an enlarged side elevation showing an end connection of the spring assembly to the vehicle frame;

FIG. 6 is a fragmentary section substantially on line 6-6 of FIG. 5;

FIG. 7 is a top plan view of the reinforced plastic leaf member apart from the suspension assembly;

FIG. 8 is a side elevational view of the plastic leaf member of FIG. 7;

FIG. 9 is an enlarged fragmentary view in section substantially on line 9-9 of FIG. 8;

FIGS. 10 and 11 are respectively side elevation and plan views of the steel leaf element; and FIG. 12 is section similar to FIG. 4 showing another embodiment.

PREFERRED EMBODIMENTS

The invention is disclosed for its preferred embodiment as incorporated in a vehicle suspension assembly 11 disposed between the vehicle frame of body indicated generally at 12 and a transverse axle member 13 here shown as the solid axle beam of a front axle although it could as well be the nonrotatable housing of a drive axle assembly.

Suspension assembly 11 consists essentially of two spring leaf members 14 and 15 of substantially equal length. These spring leaf members are rigidly secured together at their central portions and to the axle member by a pressure plate assembly indicated at 16. The opposite ends of the suspension assembly are connected to the frame through identical end structures 17. For example, at one end structure 17 is pivotally connected to a fixed pivot pin 18 on vehicle frame 12, and at the other end structure 17 is connected by pivot 18' to a shackle 20 pivoted on another fixed pivot pin 18 on the frame.

The upper spring leaf member 14 is preferably an integral element of steel of the quality usually employed for vehicle spring leaves. It preferably has constant width and constant thickness as shown in FIGS. 9 and 10, and the opposite ends are reversely curled to provide cylindrical pivot eyes 19 rockably surrounding pin 18, and the corresponding pivot pin connection to shackle 20. At its midpoint member 14 has a through bolt opening 21.

The lower spring leaf member 15 comprises a longitudinal element 22 consisting of an integral length of a solid hard tough plastic reinforced with fiber glass strands or other reinforcing material distributed throughout. It preferably is of constant width and constant thickness as shown in FIGS. 7 and 9. At the central portion of element 22, the pressure plate assembly 16 is secured. The end structures 17 are preferably secured upon the ends of element 22 prior to assembly of the leaf members into the suspension.

Pressure plate assembly 16 comprises a sheet metal body 20 having a substantially U-shaped section embracing element 22 comprising a bridge portion 23 extending across the width of element 22 above the top surface of element 22 and opposite depending legs 24 coextensively contacting the opposite side edges of element 22. As shown in FIG. 4, a rigid sheet metal plate 26 extends across the underside of element 22 to bridge legs 24 across the open end of the U-shaped body section.

Interposed between the upper flat surface of element 22 and the lower flat surface of bridge 23 is a coextensive strip 27 of compressible and preferably resilient material such as synthetic rubber. Similarly a coextensive strip 28 of compressible, preferably resilient, material such as synthetic rubber is interposed between the flat underside of element 22 and the flat upper surface of plate 26. Preferably strips 27 and 28 are adhesively attached to the surfaces of element 22.

Body 23 and plate 26 thus cooperate to provide a rigid boxlike enclosure for the central portion of the plastic leaf element, and strips 27 and 28 are tightly compressed between that rigid enclosure and element 22. The extent of compression can be controlled by accurate dimensioning of the enclosure parts in contact. Referring to FIGS. 4, 7 and 8 it will be seen that four metal loops 29 have their inner ends secured as by welding to body legs 24, and these loops provide U-bolt guides in the suspension assembly, there being two laterally aligned pairs of such loops.

The upper surface 31 of bridge 23 is flat, smooth and planar, and it is in metal to metal full surface contact with the lower flat surface 32 of the metal leaf member 14 in the assembly.

A strip 33 of hard smooth plastic overlies the top surface of metal spring leaf member 14 within the pressure plate assembly. Bridge 23, plastic leaf element 22 and plate 26 are formed with bolt holes 30, 34 and 35 respectively in line with bolt hole 21, and a bolt 36 having its enlarged head 37 engaging the underside of plate 26 and carrying a nut 38 on its threaded end 39 drawn tight against strip 33 secures the spring leaf members in subassembly prior to incorporation into the vehicle suspension.

In the subassembly the resilient strips 27 and 28 are tightly compressed but such compression is limited by engagement of plate 26 with the lower ends of legs 24, and strips 27 and 28 serve to isolate the central portion of element 22 from contact with the harder metal of bridge 23 and plate 26 to thereby protect the adjacent surfaces of leaf element 22 against cuts, scratches or other localized deformation that might contribute to localized fatigue regions as the leaf member flexes during operation. Similarly plastic strap 33 protects the smooth upper surface of metal leaf member 14 in the assembly.

It will be observed that the metal leaf member 14 and body bridge 23 are in full surface engagement at the interface 31, 32 and leaf member 14 does not contact the surface of plastic leaf element 22. Thus at the pressure plate assembly at the central portion of the suspension the relatively less hard plastic spring is protected against crushing by being enclosed laterally by the generally rectangular rigid body structure formed by bridge 23, legs 24 and plate 26, and there is only metal-to-metal contact between the central regions of the leaf members 14 and 15.

If desired the rigid enclosure could be formed by a single band of metal extending around the central portion of element 22.

In the suspension two U-bolts 41 clamp the spring leaf members together and to axle 13. As shown in FIG. 4, each bolt 41 has a bridge 42 extending laterally across the top of strip 33 and parallel legs 43 extending vertically down through loops 29 and suitable apertures 44 in the axle flange. Bolt and lock washer assemblies 45 are mounted on the threaded lower ends 46 of legs 43. As shown the leaf member attachment bolt 36 has its head 37 within a recess 47 in the axle, and flat plate 26 is in full surface contact with the upper flat surface 48 of the axle.

When nuts 45 are drawn tight the central section of the suspension is rigidly secured to axle 13. Plastic strip 33 protects the upper surface of leaf member 14 against contact with and damage by the U-bolts, and no matter how tight nuts 45 are drawn the clamping force is carried by pressure plate assembly 16 and the central section of the plastic leaf member cannot be crushed or damaged.

Referring to FIGS. 1, 2 and 5 the end cap structures 17 at opposite ends of the plastic leaf element 22 each comprise a generally sheet metal integral clip 50 having a bridge 51 overlying the upper surface of plastic la element 22 and depending parallel legs 52 at the sides of the bridge engaging the side edges of element 22. Preferably clips 50 are mounted on the ends of element 22 by providing a surface bond of epoxy or equivalent plastic bonding material therebetween. Thus clips 50 are rigidly secured upon element 22.

The bridge has a longitudinal extension in the direction of the adjacent end of the element 22 that is formed into a reversely curved arcuate retainer eye 53 that in the suspension, as shown in FIG. 5, extends with substantial clearance around the cylindrical eye 19 at the end of the metal leaf member.

Arcuate eye 53 comprises, when the vehicle is not in motion, front and rear circularly curved portions 54 and 55 respectively spaced from eye 19 to allow any necessary relative longitudinal movement between the ends of the relatively flexing spring leaf members during operation. As shown in FIG. 6, the flat lower surface 32 of metal leaf member 14 has full surface sliding contact with the flat upper surface 56 of bridge 51, and there is no surface contact between the metal leaf member 14 and plastic element 22.

FIG. 12 shows another embodiment of the invention wherein similar parts are similarly numbered. In this embodiment there are no rubber strips compressed between the enclosing rigid band structure and the plastic spring. This structure may be employed in using particularly tough plastic leaf elements.

In the suspension assembly, the metal leaf member provides strength and resistance to vertical shear forces acting on the suspension, and the molded plastic leaf member provides the designed spring rate. Since the spring leaf members are out of contact except at the central and end portions they perform their cooperative functions without interference with flexure of the assembly and the coextensive bonding of the metal and spacer members considered necessary in the prior art is eliminated with a surprising improvement in overall operation.

Both spring leaf members are protected against surface damage, and the members engage only in flat metal-to-metal wear surface contact especially at their ends. Intermediate portions of the leaf members are effectively spaced apart a distance determined by the thickness of bridges 23 and 51.

While a center bolt 36 is disclosed for holding the members in assembly in the foregoing embodiments, such a central bolt may be eliminated by molding or otherwise incorporating metal studs into the isolators 27 and 28 to provide good frictional attachment of the plastic element 22 to the rigid metal enclosure at pressure plate 16. The U-bolts 41 adequately clamp the central portion of metal leaf member 14 to the pressure plate assembly.

The embodiments of the invention in which an exclusive property or privilege is claimed are defined as follows:

1. A composite leaf spring assembly adapted to be interposed between a vehicle body and a supporting axle structure comprising two substantially coextensive individual spring leaf members, one being a metal element of substantially constant width and substantially constant thickness and the other being of substantially constant width and made mainly of hard tough resilient plastic, means at the opposite ends of both of said leaf members for attachment to the vehicle body, and means for fixedly attaching intermediate portions of both of said leaf members together and to said axle structure with the portions of said leaf members extending longitudinally between said intermediate and end attachment means being free of surface contact.

2. The composite leaf spring assembly defined in claim 1, wherein said other leaf member comprises an integral plastic leaf element and said means for attaching the leaf members together comprises rigid means extending around the intermediate portion of said plastic leaf element.

3. The composite leaf spring assembly defined in claim 1, wherein said metal leaf member is an integral steel element having pivot eyes at opposite ends for attachment to the vehicle body.

4. The composite leaf spring assembly defined in claim 2, wherein said plastic leaf member comprises a shaped molded plastic element and said rigid means is a boxlike metal structure protectively enclosing said portion of said plastic leaf element.

5. The composite leaf spring assembly defined in claim 2, wherein said intermediate portion is protected against crushing in the assembly by a rigid enclosure structure in the attachment means therefor, and there being resilient cushioning means compressed between the enclosure and said intermediate portion of said plastic leaf element.

6. The composite leaf spring assembly defined in claim 1, wherein said attachment means at the end of the plastic leaf member comprises an integral metal structure having sliding bearing contact with the adjacent surface of said metal leaf member.

7. The composite leaf spring assembly defined in claim 6, wherein said metal leaf member has eyes at opposite ends for pivotal attachment to the vehicle body and each said metal end structure on the plastic leaf member comprises an arcuate portion extending loosely rockably around the adjacent one of said eyes.

8. In a vehicle suspension, a composite leaf spring assembly comprising coextensive leaf members composed essentially respectively of steel and reenforced nonmetallic hard resilient plastic, means attaching said members together in metal-to-metal contact only at their intermediate portions and at their end portions comprising metal structures affixed to said plastic leaf member and having full surface engagement with said metal leaf member, the remainders of said leaf members being free of contact with each other.

9. In the vehicle suspension defined in claim 8, said metal structure at the intermediate portion of said plastic leaf member comprising a rigid hollow body protectively enclosing said intermediate portion, and upon which the intermediate portion of said metal leaf member is clamped in full surface engagement.

10. In the vehicle suspension defined in claim 9, said leaf members being secured to an axle structure at said intermediate portions by U-bolts having bridges extending over said metal member and parallel legs extending through side guides on said hollow body.

11. In the vehicle suspension defined in claim 8, said metal structures being in sliding bearing engagement with said metal leaf element.

12. A spring leaf member for a vehicle suspension system comprising an integral leaf element of hard tough plastic having substantially constant width, a crush-resistant relatively rigid metal seat structure protectively surrounding an intermediate portion of said spring leaf, and metal end structures secured to the opposite ends of said element, said seat and end structures all having upper surfaces adapted for relatively wide area metal-to-metal contact with a substantially coextensive metal spring leaf member in the suspension.